United States Patent
Takamiya

(10) Patent No.: US 11,303,813 B2
(45) Date of Patent: Apr. 12, 2022

(54) IMAGE PICKUP APPARATUS WITH FOCUS CONDITION DETERMINATION

(71) Applicant: CANON KABUSHIKI KAISHA, Tokyo (JP)

(72) Inventor: Hideaki Takamiya, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 81 days.

(21) Appl. No.: 16/748,962

(22) Filed: Jan. 22, 2020

(65) Prior Publication Data
US 2020/0275034 A1 Aug. 27, 2020

(30) Foreign Application Priority Data
Feb. 25, 2019 (JP) .............................. JP2019-031396

(51) Int. Cl.
*H04N 5/232* (2006.01)

(52) U.S. Cl.
CPC ... *H04N 5/232939* (2018.08); *H04N 5/23209* (2013.01); *H04N 5/232122* (2018.08)

(58) Field of Classification Search
None
See application file for complete search history.

(56) References Cited

U.S. PATENT DOCUMENTS

| | | | |
|---|---|---|---|
| 4,577,952 A * | 3/1986 | Urano | G03B 17/18 396/227 |
| 8,760,527 B2 * | 6/2014 | Prentice | H04N 5/238 348/221.1 |
| 9,300,862 B2 | 3/2016 | Saito et al. | |
| 2007/0104474 A1 * | 5/2007 | Tamura | G03B 17/14 396/91 |
| 2013/0141624 A1 * | 6/2013 | Tomizawa | H04N 5/23209 348/333.02 |
| 2014/0192167 A1 * | 7/2014 | Hayashi | G03B 13/36 348/49 |
| 2014/0347541 A1 * | 11/2014 | Okazaki | H04N 5/232939 348/333.02 |
| 2014/0368719 A1 * | 12/2014 | Kaneko | H04N 5/23296 348/333.02 |
| 2015/0296128 A1 * | 10/2015 | Saito | H04N 5/36961 348/353 |

(Continued)

FOREIGN PATENT DOCUMENTS

JP 2018-155904 A 10/2018

*Primary Examiner* — Cynthia Segura
(74) *Attorney, Agent, or Firm* — Venable LLP

(57) ABSTRACT

In a case where an in-focus threshold value is set based on an F number, when a zoom or a focus is changed, the threshold value will change, so that an in-focus indication happens to be switched to an out-of-focus indication.

To solve the problem, an image pickup apparatus has an image pickup unit that picks up an optical image formed through an optical system, wherein the optical system has a zoom function and F number thereof varies within a predetermined range according to a plurality of zoom conditions, a determination unit that determines an in-focus condition when a defocus amount of an object is smaller than predetermined first threshold value, wherein the first threshold value is determined by a minimum F number within the predetermined range, and a focus indication unit that indicates a first in-focus indication when the focus condition is in-focus condition.

11 Claims, 11 Drawing Sheets

(56) References Cited

U.S. PATENT DOCUMENTS

| | | | |
|---|---|---|---|
| 2016/0021299 A1* | 1/2016 | Endo | H04N 9/04557 |
| | | | 348/345 |
| 2017/0184809 A1* | 6/2017 | Suzuki | G02B 7/08 |
| 2017/0347019 A1* | 11/2017 | Ito | G02B 7/28 |
| 2018/0081148 A1* | 3/2018 | Tomita | G02B 15/144 |
| 2018/0217352 A1* | 8/2018 | Kamba | H04N 5/232123 |
| 2018/0278830 A1* | 9/2018 | Hamano | G03B 13/32 |
| 2019/0238756 A1* | 8/2019 | Tokioka | H04N 5/238 |
| 2019/0327408 A1* | 10/2019 | Kawarada | H04N 5/232 |

* cited by examiner

PLANE VIEW a-a SECTIONAL VIEW

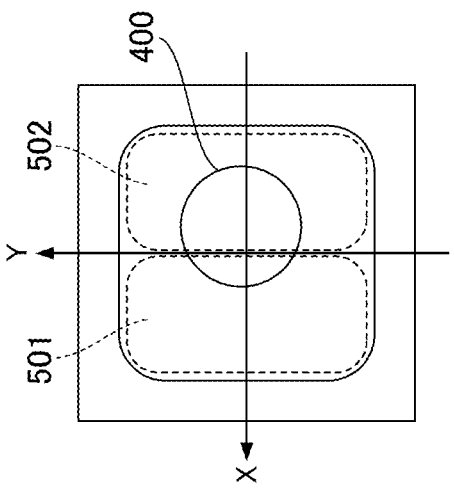 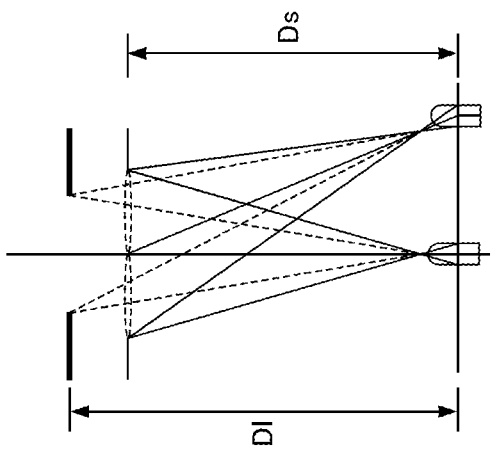
FIG. 8A
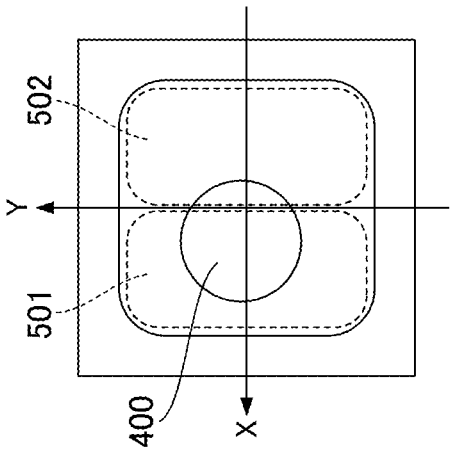 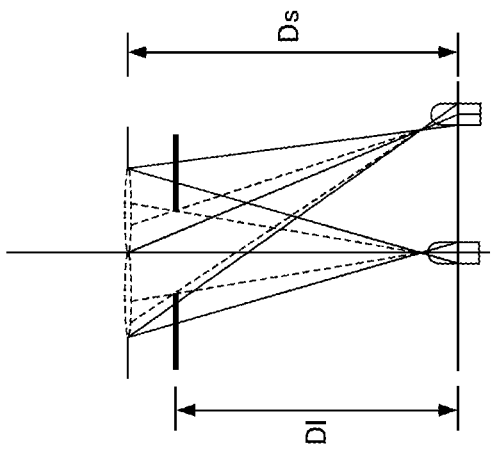
FIG. 8B
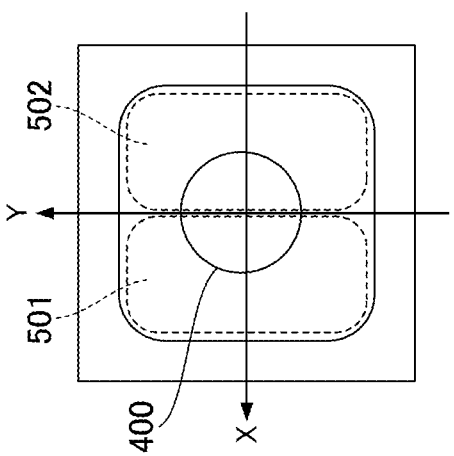 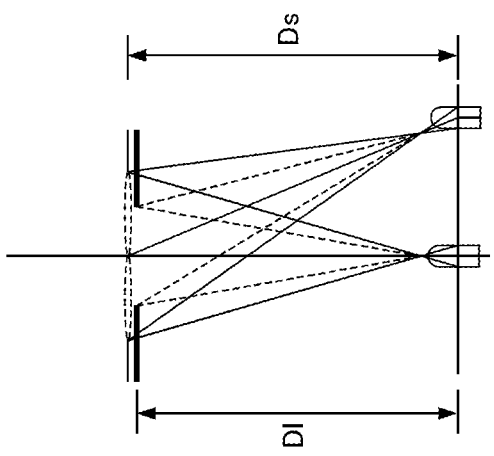
FIG. 8C FIG. 11
11-1 11-2 11-3
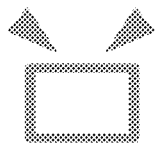 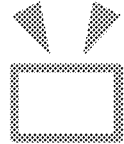 

IMAGE PICKUP APPARATUS WITH FOCUS CONDITION DETERMINATION

BACKGROUND OF THE INVENTION

Field of the Invention

The present invention relates to an image pickup apparatus that can display a focus conditions.

Description of the Related Art

In general, when taking a still photograph, a well-known autofocus function, hereinafter AF, is often used to focus on an object. However, when taking video, an AF operation for automatically adjusting focus is also recorded as a part of the video. Therefore, a manual focus, hereinafter MF, is sometimes used for adjusting focus, without using the AF.

By using the MF for adjusting focus, it is possible to take video while adjusting focus on an arbitrary object with an arbitrary speed.

However, when adjusting focus, it is sometimes difficult to tell part of the focused object is focused, because display screens on the back of cameras do not have sufficient resolution.

To solve this kind of problem, Japanese Patent Application Laid-open No. 2018-155904 discloses a configuration for assisting the MF operation.

According to Japanese Patent Application Laid-open No. 2018-155904, when an operator uses the MF function, depending on a remaining defocus amount information, it is possible to take focused video.

However, after adjusting focus and a focus indicator indicates an in-focus condition, if a zoom operation is performed, the focus indicator sometimes changes to indicate an out-of-focus condition.

This is caused by the indicator using the defocus amount information for displaying the focus indication, where a threshold value for displaying the in-focus indication depends on open F numbers, and the open F numbers vary according to the zoom operation.

For example, in a combination of a certain image pickup apparatus and an optical system, if an operator focuses on an object using the MF in a zoom state where an open F number is 5.6, the focus indication on the image pickup apparatus is calculated by multiplying the open F number 5.6 and a certain coefficient.

In the above condition, if the operator performs a zoom operation and sets a zoom condition where the open F number is 2.8, then the focus indication is calculated by using the open F number 2.8, so that the threshold values for defocus amount before the zoom operation and after the zoom operation differs by two times.

Therefore, when using the MF, even if the remaining defocus amount is just below the threshold value before a zoom operation, and if the threshold changes to a half by the zoom operation, the focus indication is changed to indicate an out-of-focus.

SUMMARY OF THE INVENTION

An object of the present invention is to provide an image pickup apparatus that can solve the problems mentioned above and can properly indicate focus condition even when an operator performs a zoom operation after focusing by using the MF, and so on.

In order to solve the above problems, an image pickup apparatus according to one aspect of the present invention comprises:

an image pickup unit configured to pick up an optical image formed through an optical system, wherein the optical system has a zoom function and F number thereof varies within a predetermined range according to a plurality of zoom conditions;

a determination unit configured to determine an in-focus condition when a defocus amount of an object is smaller than a predetermined first threshold value, wherein the first threshold value is determined by a minimum F number within the predetermined range; and a focus indication unit configured to indicate a first in-focus indication when the determination unit determines that the focus condition is in-focus condition.

Further features of the present invention will become apparent from the following description of exemplary embodiments with reference to the attached drawings.

BRIEF DESCRIPTION OF THE DRAWINGS

FIG. 8A to 8C illustrate shading caused by deviation of pupils corresponding to the first and the second focus detection signals.

FIG. 11 illustrates another example of the in-focus display according to Embodiment 2.

DESCRIPTION OF THE EMBODIMENTS

Figure 1:
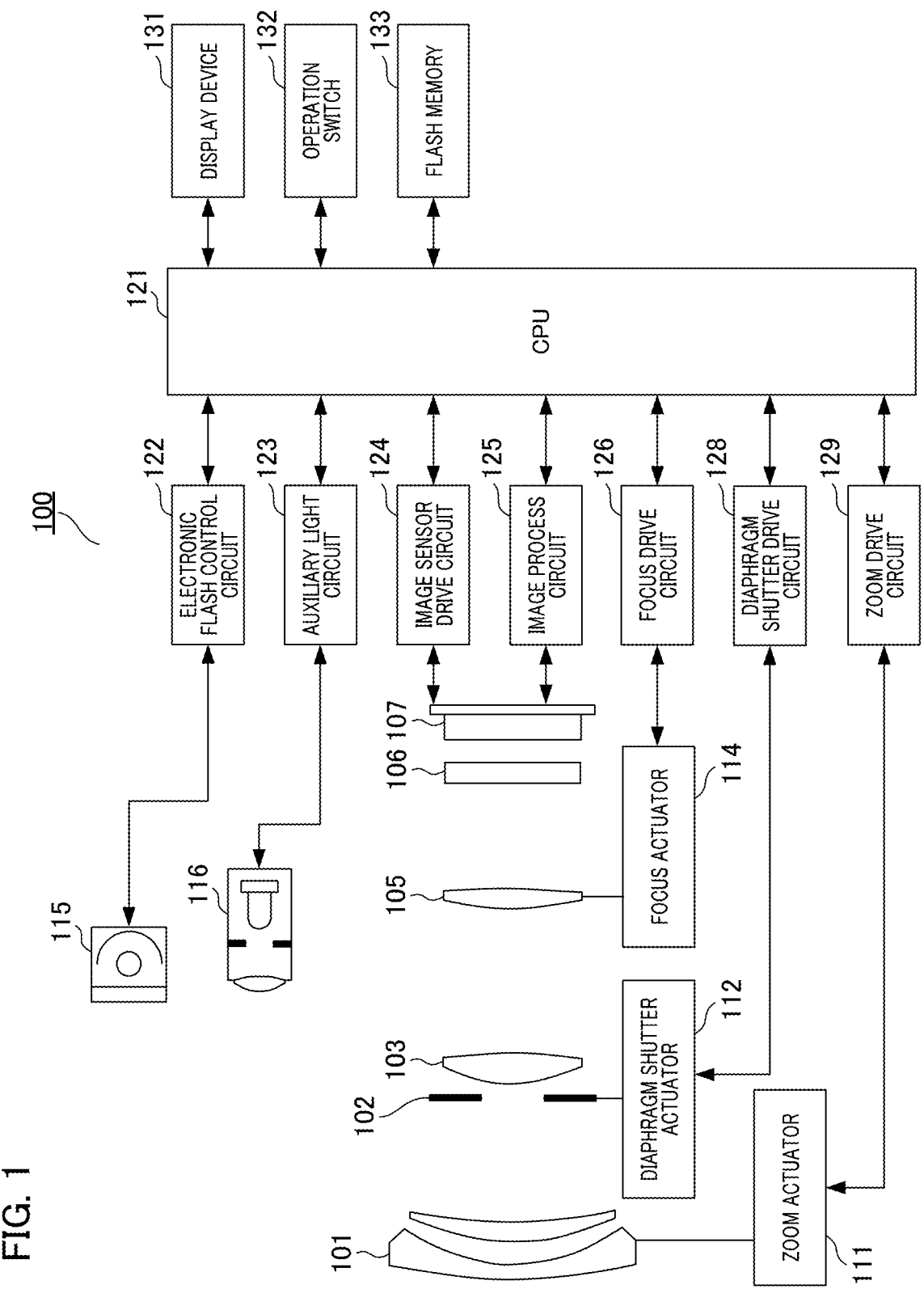
FIG. 1 is a block diagram of an image pickup apparatus according to Embodiment 1.

Hereinafter, an imaging apparatus according to embodiments of the present invention will be described with reference to the drawings. Here, the same reference numerals are given to units that have the same functions throughout the drawings and repeated description thereof will be omitted.

Embodiment 1

In Embodiment 1, an image plane phase difference detection method is adopted to detect a defocus amount, which is used to display an indicator for assisting a focus adjustment in the MF operation.

Although the image plane phase difference detection method is explained in this embodiment as below, the method for detecting defocus amount is not limited to this method and can be any other method as far as the defocus amount can be detected.

For example, an image sensor for phase difference detection may be separately provided from an image sensor for picking up images for recording or displaying.

FIG. 1 is a block diagram of an image pickup apparatus (such as a camera) 100 according to Embodiment 1.

In FIG. 1, 101 denotes a first lens group arranged in a focusing optical system, and is held to be movable in an optical axis direction. 102 denotes a diaphragm shutter mechanism used as a shutter and a diaphragm, which can adjust an exposure when taking pictures and can serve as a shutter for controlling an exposure period when taking a still picture.

103 denotes a second lens group that moves in the optical axis direction with the diaphragm shutter mechanism 102, and performs a variable magnification (a zoom) function by a linkage with the first lens group. In Embodiment 1, F number of the focusing optical system varies within a predetermined range, between a minimum F number and a maximum F number, according to a zoom condition.

In this connection, a lens barrel including lenses for the focusing optical system in FIG. 1 may be fixed to the image pickup apparatus or may be included in a zoom lens unit that can be detachably mounted to the image pickup apparatus.

In a case of the zoom lens unit detachable to the image pickup apparatus, electrical contacts and a transmission circuit are provided in the zoom lens unit so that, for example, the information on the minimum F number of the focusing optical system is transmitted to the image pickup apparatus.

In that case, electrical contacts and a receiving circuit are also provided in the image pickup apparatus to receive the information on the minimum F number of the focusing optical system. Here, the receiving circuit serves as a communication means.

105 denotes a third lens group for adjusting focus by a movement in the optical axis direction. 106 denotes an optical lowpass filter for reducing fake colors or a moire in an image. 107 denotes an image sensor that includes a two-dimensional CMOS photosensor and peripheral circuits. The image sensor 107 is arranged on a focal plane of the focusing optical system to photoconvert an optical image passed through the focusing optical system to generates an image signal.

111 denotes a zoom actuator for rotating a cam barrel (not shown) to move the first lens group 101, the second lens group 103, and the third lens group 105 in the optical axis direction so that the magnification is varied.

112 denotes a diaphragm shutter actuator for controlling an aperture size of the diaphragm shutter mechanism to control an exposure amount and, when taking the still picture, an exposure period.

114 denotes a focus actuator for adjusting focus by moving the third lens group 105 in the optical axis direction.

115 denotes an electronic flash for illuminating an object, wherein the electronic flash 115 may include a flash illumination apparatus using a xenon tube, an illumination apparatus using LEDs that can perform continuous illumination, and so on.

116 denotes an AF auxiliary illumination means for projecting an image of a mask having a predetermine aperture pattern through a projection lens to an object so as to improve focus detection ability for a dark object or a low contrast object.

121 denotes a camera CPU as a computer for controlling various operations in the camera. The camera CPU 121 includes an operation circuit, a ROM, a RAM, an A/D converter, a D/A converter, a communication interface, and so on.

The camera CPU 121 controls to drive various circuits in the camera according to a predetermined computer program stored in the ROM to sequentially perform an AF, an image pick up, an image processing, a recording, and so on.

122 denotes an electronic flash control circuit for controlling electronic flash 115 to illuminate an object in synchronism with an image pickup operation.

123 denotes an auxiliary light circuit for controlling the AF auxiliary illumination means 116 to illuminate an object in synchronism with a focus detection operation.

124 denotes an image sensor drive circuit for controlling the image sensor 107 to perform an image pickup operation to obtain an image signal, and to A/D convert the image signal so as to be transmitted to the CPU 121.

125 denotes an image process circuit for processing the image obtained by the image sensor 107 so as to perform a gamma conversion, a color correction, a PEG compression, and so on.

126 denotes a focus drive circuit for controlling driving the focus actuator 114 according to a result of the focus detection so as to move the third lens group 105 in the optical axis direction to adjust focus.

In this connection, the focus drive circuit 126 and the focus actuator 114 together serve as a focus adjusting means for performing an focusing operation to focus on an object by driving the optical system.

128 denotes a diaphragm shutter drive circuit for controlling to drive the diaphragm shutter actuator 112 so as to control the aperture of the diaphragm shutter mechanism 102.

129 denotes a zoom drive circuit for driving the zoom actuator 1 according to a zoom operation by an operator.

131 denotes a display device such as an LCD or an organic EL for displaying information on camera photography modes, a preview image before taking a still picture, an image for reviewing after taking the still picture, focusing condition indicators while detecting focus, and so on.

132 denotes a group of operation switches, including a power switch, a shutter release switch, a zoom operation switch, a photography mode switch, a manual focus operation member, and so on.

The manual focus operation member serves as a focusing means for performing a focusing operation to manually drive the optical system to focus on the object 133 denotes a detachable flash memory for recording images after photographing.

In this embodiment, although the manual focus operation member serves as a focusing means, the focusing means may solely be an automatic focusing means for performing an automatic focusing operation, or may be a combination of the manual focus operation member and the automatic focusing means.

Figure 2:
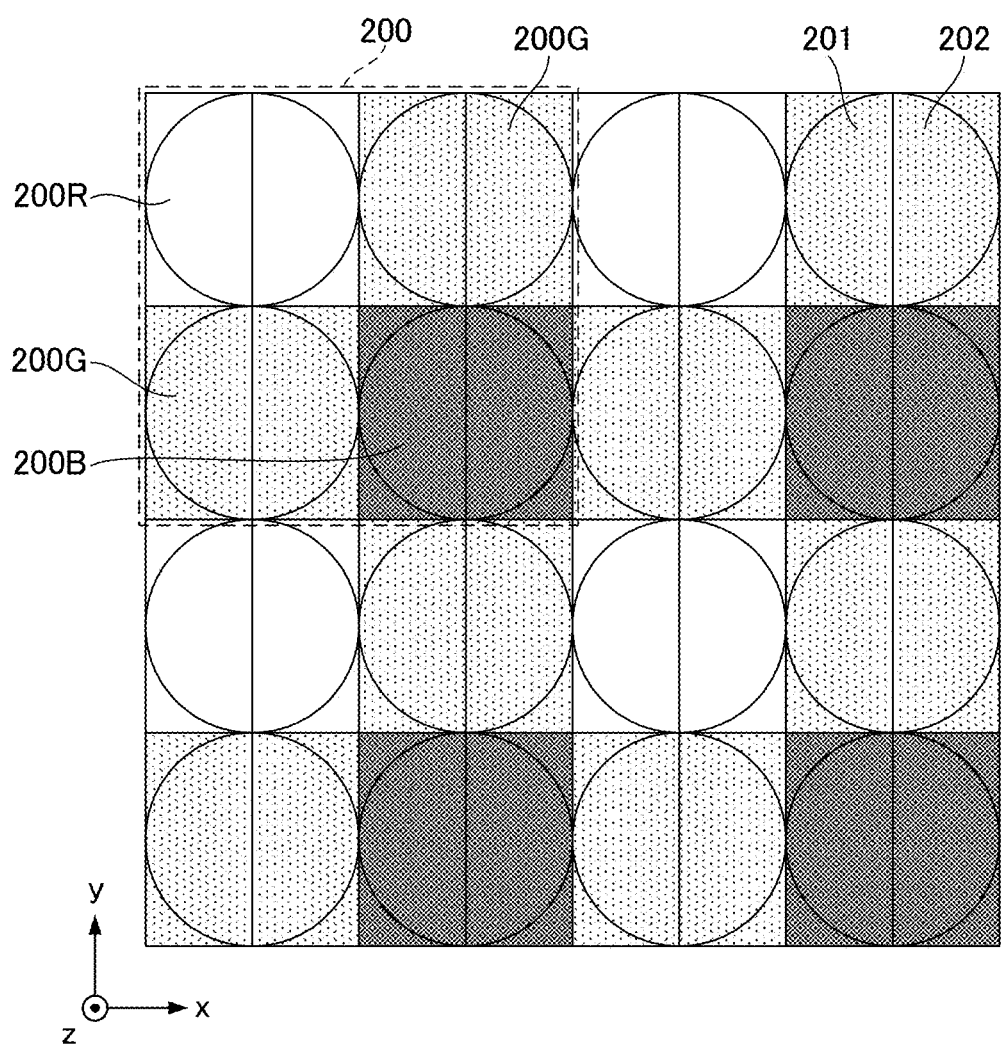
FIG. 2 illustrates an example of pixel arrangement of an image sensor according to Embodiment 1.

FIG. 2 illustrates an example of pixel arrangement of the image sensor 107 according to Embodiment 1.

FIG. 2 shows the pixel arrangement of a two-dimensional CMOS image sensor as the image sensor 107, wherein 4 image pickup pixels are arranged in row direction and 4 image pickup pixels are arranged in column direction.

Herein, each image pickup pixel is divided into two focus detection pixels in row (horizontal) direction so that 8 focus detection pixels are arranged in row direction and 4 focus detection pixels are arranged in column direction in FIG. 2.

In FIG. 2, each image pickup pixel group 200 including 4 image pickup pixels surrounded by a dotted line has a color filter pattern consisting of a Red filter, Green filters, and a Blue filter.

In each pixel group, an image pickup pixel 200R having spectral sensitivity for red is arranged in a upper left position, image pickup pixels 200G having spectral sensitivity for green are arranged in a upper right position and a lower left position, and an image pickup pixel 200B having spectral sensitivity for blue is arranged in a lower right position.

Each of the spectral sensitivity is obtained by arranging a red, a green, or a blue color filter above respective image pickup pixel. The image pickup pixel group 200 is repeatedly arranged in horizontal and vertical direction.

Wherein, each image pickup pixel consists of a first focus detection pixel 201 and a second focus detection pixel 202 arranged in horizontal direction.

The image pickup pixels consisting of 4 rows and 4 columns, which correspond to focus detection pixels consisting of 4 rows and 8 columns in FIG. 2, are repeatedly arranged on an image plane of the image sensor so that it is possible to obtain an image pickup signal and a focus detection signal.

In Embodiment 1, the image sensor includes about 20.75 millions of image pickup pixels arranged in 5575 columns by 3725 rows, wherein a pitch P of image pickup pixels is 4 μm, so that the image sensor includes about 41.5 millions of focus detection pixels arranged in 11150 columns by 3725 rows, wherein a pitch PAF of focus detection pixels in horizontal direction is 2 μm.

Figure 3A:
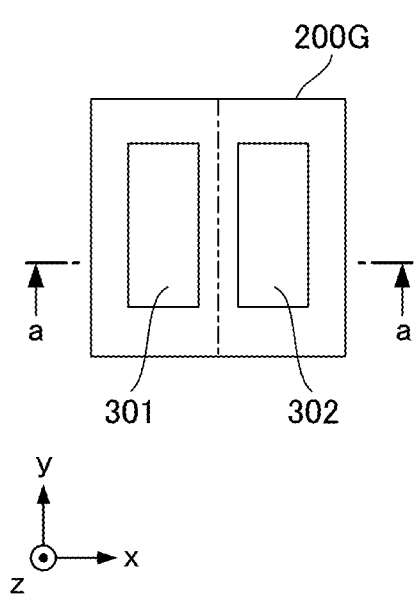
FIG. 3A illustrates a plane view of a pixel according to Embodiment 1.
Figure 3B:
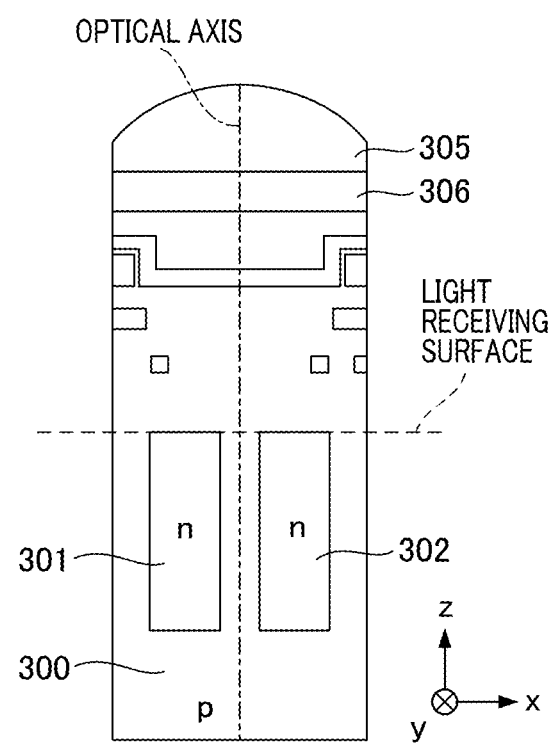
FIG. 3B illustrates a sectional view of the pixel in FIG. 3A.

FIG. 3A illustrates a plane view of a pixel according to Embodiment 1, and FIG. 3B illustrates an a-a sectional view of the pixel shown in FIG. 3A.

As shown in FIG. 3, the pixel 200G (each pixel) has a micro lens 305 for condensing light at a light receiving side and includes two divided parts, a photoconversion part 301 and a photoconversion part 302, are formed along x direction.

The photoconversion part 301 and a photoconversion part 302 respectively correspond to the first focus detection pixel and the second focus detection pixel.

The photoconversion part 301 and a photoconversion part 302 may be configured as PIN structure photodiodes sandwiching an intrinsic layer by a P type layer and an N type layer, or as PN junction photodiodes without using the intrinsic layer.

In each pixel, between the micro lens 305 and the photoconversion parts 301 or 302, a color filter 306 is provided. The spectral characteristic of each filter of each image pickup pixel may be different as shown in FIG. 2, or some of the image pickup pixel may have color filters.

The light entered into the pixel 200G shown in FIG. 3 is condensed by the micro lens 305, is filtered by the color filter 306, then is received by the photoconversion parts 301 and 302.

In each of the photoconversion parts 301 and 302, pairs of an electron and a hole are generated according to received light amount.

Then they are separated by a depletion layer, so that electrons are store in the N type layer and holes are eliminated to an outside of the image senor via the P type layer 300 connected to a constant voltage source (not shown).

The electrons stored in the N type layer of the photoconversion parts 301 and 302 are respectively transferred to a floating diffusion FD (not shown) vis a transfer gate (not shown) and are converted to voltage signals.

Figure 4:
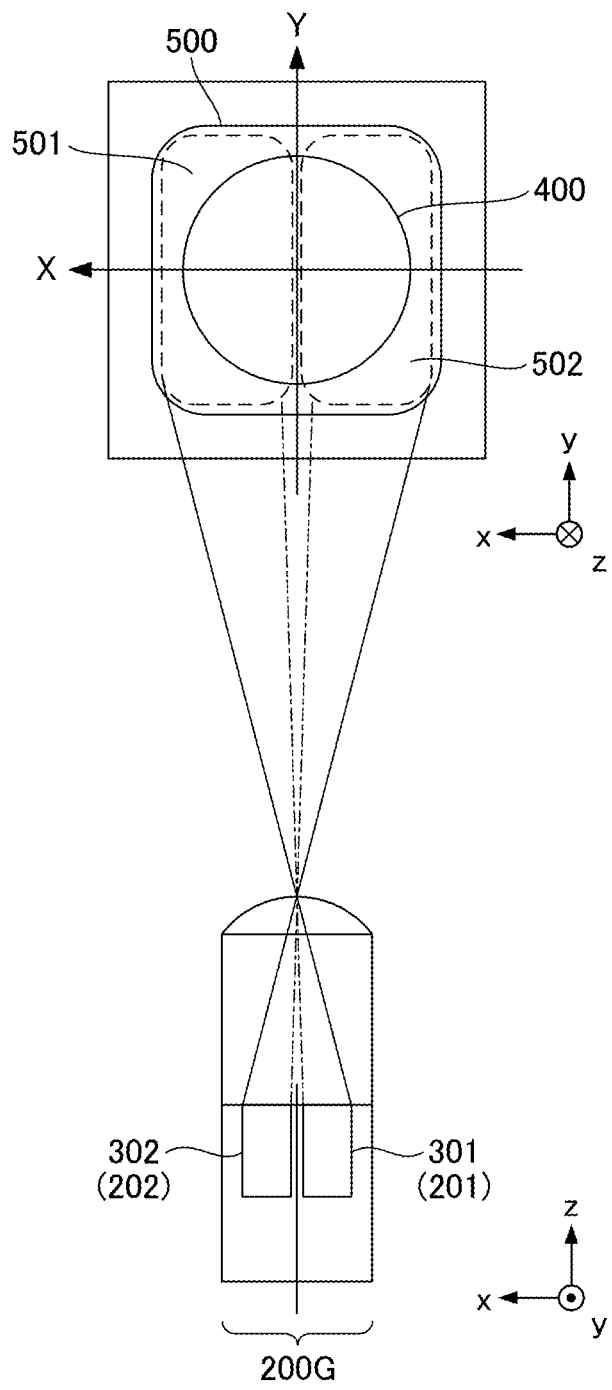
FIG. 4 is a schematic diagram illustrating the correspondence between the pixel and the pupil division according to Embodiment 1.

Next, FIG. 4 is a schematic diagram illustrating the correspondence between the pixel and the pupil division according to Embodiment 1.

A lower part of FIG. 4 is an a-a sectional view of the pixel shown in FIG. 3A viewed from +y direction, and an upper part of FIG. 4 illustrates a plane view of corresponding exit pupils of the focusing optical system.

In FIG. 4, the x axis and the y axis are reversed compared to FIG. 3B to show the correspondence between the coordinate of exit pupils and the photoconversion parts 301 and 302.

In FIG. 4, 500 denotes a pupil region through which light enters onto a whole of the image pickup pixel 200G. The pupil region 500 includes a first pupil region 501 and a second pupil region 502. The first pupil region 501, via the micro lens, corresponds to a light receiving surface of the photoconversion parts 301 whose center of sensitivity is deviated from the optical axis to −x side.

The first focus detection pixel 201 can receive light passed through the first pupil region 501.

A center of gravity of the first pupil region 501, which corresponds to the first focus detection pixel 201, is deviated to +X side in a plane of pupil shown in FIG. 4.

In FIG. 4, the second pupil region 502, via the micro lens, corresponds to a light receiving surface of the photoconversion part 302 whose center of sensitivity is deviated from the optical axis to +x side.

The second focus detection pixel 202 can receive light passed through the second pupil region 502.

A center of gravity of the second pupil region 502, which corresponds to the second focus detection pixel 202, is deviated to −X side in a plane of pupil shown in FIG. 4.

In FIG. 4, 400 denotes an exit pupil of the focusing optical system defined by an aperture of the diaphragm, and so on. An outside of the exit pupil 400 is vignetting area.

The photoconversion parts 301 and 302, which respectively correspond to the first focus detection pixel 201 and the second focus detection pixel 202, forms the image pickup pixel 200G in FIG. 4.

Figure 5:
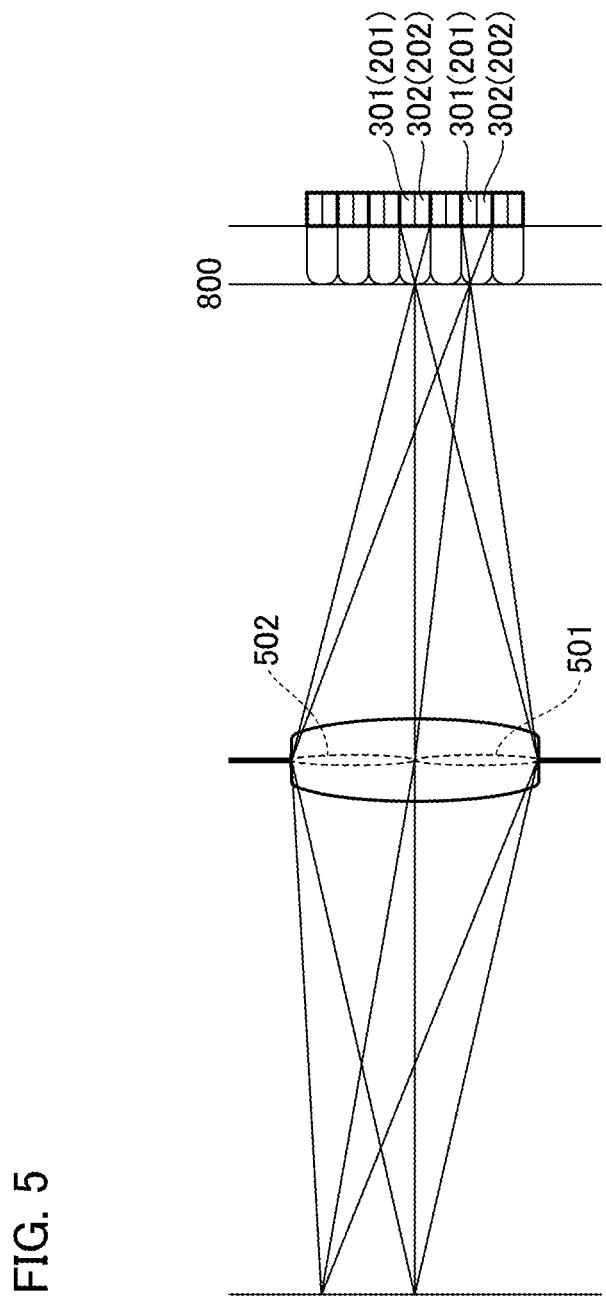
FIG. 5 is a schematic diagram illustrating the correspondence between the image sensor and the pupil division according to Embodiment 1.

Next, FIG. 5 is a schematic diagram illustrating the correspondence between the image sensor and the pupil division according to Embodiment 1.

Light passed through the first pupil region 501 and the second pupil region 502 respectively enter to the micro lens of each image pickup pixel of the image sensor at different angles.

Then, each light are received by the first focus detection pixel 201 (the photoconversion parts 301) and the second focus detection pixel 202 (the photoconversion parts 302) respectively, Here, in Embodiment 1, although the pupil region is divided into two in a horizontal direction, the pupil region may be divided in a vertical direction when needed.

In this Embodiment 1, a lot of pairs of the first focus detection pixel 201 for receiving light through the first pupil region and the second focus detection pixel 202 for receiving light through the second pupil region are arranged in an image pickup plane as shown in FIG. 2.

In addition, in this Embodiment 1, each image pickup pixel consists of the first focus detection pixel and the second focus detection pixel, so that each image pickup pixel receives light passed through the pupil region 500, which consists of the first pupil region and the second pupil region. However, the image pickup pixels and the focus detecting pixels may be configured differently and may be separately arranged in the image pickup plane.

For example, a lot of image pickup pixels each of which is not divided into two photoconversion parts may be arranged in matrix in the image pickup plane while only some of the image pickup pixels, which are dispersed, may be divided into the first focus detection pixel and the second focus detection pixel.

In this Embodiment 1, a first focusing signal is formed by congregating signals from the first focus detection pixels 201, and a second focusing signal is formed by congregating signals from the second focus detection pixels 202, then using the first and the second focusing signal, a focus detection is performed.

In addition, by adding signals from the first focus detection pixels 201 and the second focus detection pixels 202 of each image pickup pixel, an image signal having a resolution corresponding to total number N of all the effective image pickup pixels.

Figure 6:
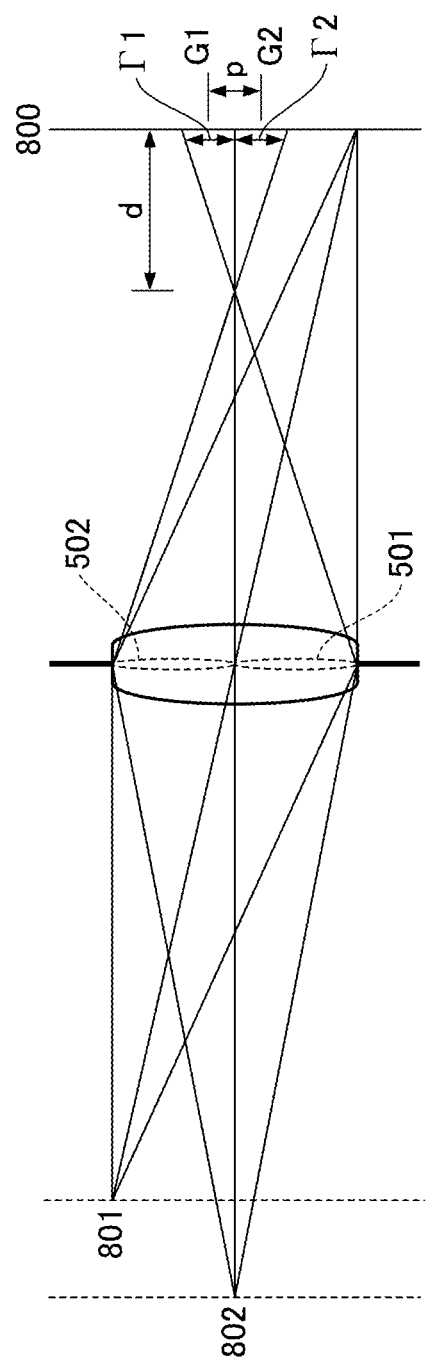
FIG. 6 is a schematic diagram illustrating the relation between an amount of image shift and a defocus amount according to Embodiment 1.

Next, the relationship among the first focus detection signal, the second focus detection signal, the defocus amount, and the image shift is explained referring to FIG. 6.

FIG. 6 is a schematic diagram illustrating the relation between an amount of image shift and a defocus amount according to Embodiment 1.

The image sensor (not shown in FIG. 6) is arranged on the image pickup plane 800, wherein the exit pupil is divided into the first pupil region 501 and the second pupil region 502 as explained using FIGS. 4 and 5.

The defocus amount d is defined by a distance|d| between the image pickup plane and a focusing position of an image of the object.

In a front-focus condition, where the focusing position is at an object side of the image pickup plane, d is defined as negative, d<0, and in a rear-focus condition, where the focusing position is at an opposite side of the image pickup plane with respect to the object, d is defined as positive, d>0.

In a just focus condition, where the focusing position is at the image pickup plane, d=0.

In FIG. 6, an object 801 is in a just focus condition (d=0), and an object 802 is in a front-focus condition (d<0). The front-focus condition (d<0) and the rear-focus condition (d>0) are called a defocus condition (|d|>0).

In the front-focus condition (d<0), a light flux from the object 802 passed through the first pupil region 501 and the second pupil region 502 are once converged then spread on the image pickup plane 800 from respective center of gravities G1 and G2 by a width Γ1 and Γ2 so that forms a blurred image.

The blurred image is received by the first focus detection pixels 201 and the second focus detection pixels 202, so that the first focus detection signal and the second focus detection signal are generated.

Therefore, the first focus detection signal and the second focus detection signal respectively correspond to the blurred image formed at the center of gravities G1 and G2 by a width Γ1 and Γ2.

As the defocus amount|d| increases, the width Γ1 and Γ2 increases, proportionally in general, so that an image shift amount|p|, which is an absolute value of shift amount p (=difference between positions of G1 and G2) between a position of the first focus detection signal and a position of the second focus detection signal, increases accordingly.

As to the rear-focus condition (d>0), although a direction of image shift of the first focus detection signal and the second focus detection signal is reversed, the other things are similar to the above.

Therefore, as the blur of the images, which are the first focus detection signal, the second focus detection signal, and the image pickup signal, increases, the shift amount between the first focus detection signal and the second focus detection signal increases.

Next, a focus detection method is explained.

In the image plane phase difference method, the first focus detection signal and the second focus detection signal are relatively shifted and correlation amount (a first evaluation value), which indicates how both signals are matched, is calculated to find the shift amount where the maximum first evaluation value is obtained.

Since as the defocus amount increases, the shift amount between the first focus detection signal and the second focus detection signal increases, the shift amount is converted to obtain the defocus amount, then the focus lens is adjusted based on the defocus amount.

Figure 7:
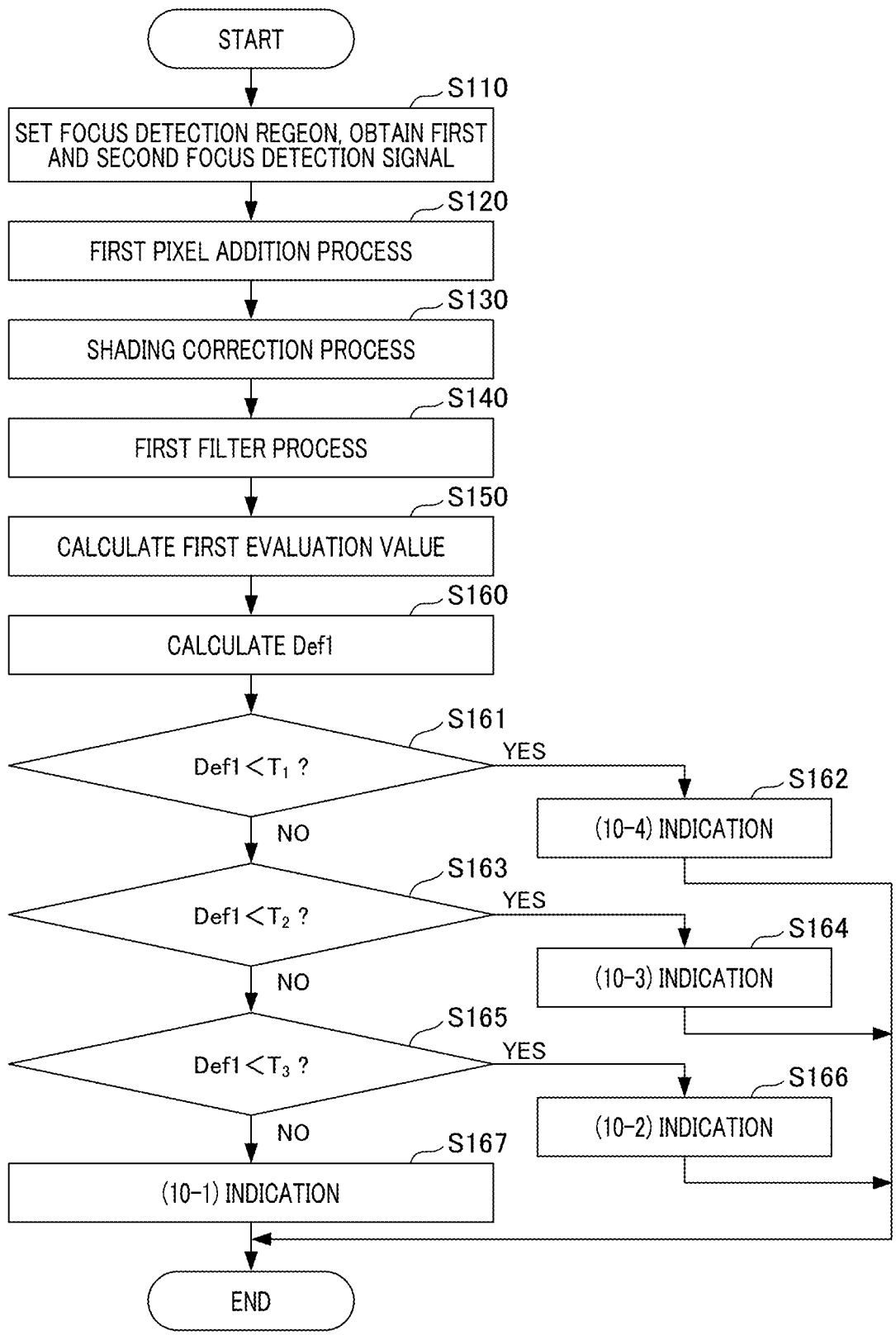
FIG. 7 is a flowchart illustrating the focus detection process according to Embodiment 1.

FIG. 7 is a flowchart illustrating the focus detection process according to Embodiment 1, wherein the focus detection process shown in FIG. 7 is performed by using the focus detection signal generating means, the image sensor 107, the image process circuit 125, the CPU 121, and so on.

In step S110, a focus detection area for focus detection is selectively set from an effective pixel area of the image sensor.

The focus detection signal generating means generates the first focus detection signal from signals of the first focus detection pixels within the focus detection area, and the second focus detection signal from signals of the second focus detection pixels within the focus detection area.

In step S120, the first focus detection signal and the second focus detection signal are processed by a first pixel addition process, wherein every three adjacent pixel signals are added to reduce high frequency component, and R, G, and B signals are added to generate Y (luminance) signal.

In step S130, the first focus detection signal and the second focus detection signal are respectively processed by a shading correction process and an optical distortion correction process.

Here, the shadings of first focus detection signal and the second focus detection signal, which are caused by a deviation of pupils is explained.

FIG. 8 illustrates shadings caused by deviation of pupils corresponding to the first and the second focus detection signals.

In FIG. 8, a relationship among the exit pupil 400, an image pickup pixel locating at the center of the image sensor, and an image pickup pixel locating at a periphery of the image sensor are shown, wherein each image pickup pixel includes the first focus detection pixel 201 and the second focus detection pixel 202. In FIG. 8, the first pupil region 501 and the second pupil region 502 are also shown.

In FIG. 8A, an exit pupil distance Dl of the focusing optical system and a predetermined pupil distance Ds of the image sensor are equal.

In this case, the exit pupil 400 of the focusing optical system is almost evenly divided by the first pupil region 501 and the second pupil region 502.

Contrary to the above, in FIG. 8B, the exit pupil distance Dl of the focusing optical system is shorter than the predetermined pupil distance Ds of the image sensor, a gap between the exit pupil 400 of the focusing optical system and an entrance pupil of the image sensor is caused at the periphery of the image sensor, so that the exit pupil 400 of the focusing optical system is unevenly divided.

Similarly, in FIG. 8C, the exit pupil distance Dl of the focusing optical system is longer than the predetermined pupil distance Ds of the image sensor, a gap between the exit pupil of the focusing optical system and an entrance pupil of the image sensor is caused at the periphery of the image sensor, so that the exit pupil 400 of the focusing optical system is unevenly divided.

When division of the pupil becomes uneven, levels of the first focus detection signal and the second focus detection signal becomes uneven, so that the shading caused by the unevenness of signal levels between the first focus detection signal and the second focus detection signal arises.

In step S130 in FIG. 7, a first shading correction coefficient for correcting the first focus detection signal and a second shading correction coefficient for correcting the second focus detection signal are prepared in advance by measurement or simulation according to a distance from the center of the image sensor, an F number of the focusing optical system, and the exit pupil distance Dl.

By multiplying the first shading correction coefficient with the first focus detection signal and by multiplying the second shading correction coefficient with the second focus detection signal, the first focus detection signal and the second focus detection signal are corrected in this optical shading correction process.

In the focus detection method using the phase difference, based on the correlation between the first focus detection signal and the second focus detection signal, the defocus amount is detected. Therefore, if the shading caused by the gap of pupils arises, there is a possibility that the correlation between the first focus detection signal and the second focus detection signal decreases.

Thus, it is preferable to apply the optical shading correction process to improve the correlation between the first focus detection signal and the second focus detection signal so that focus detection ability can be improved.

In step S140 in FIG. 7, a first filtering process is applied to the first focus detection signal and the second focus detection signal.

Figure 9:
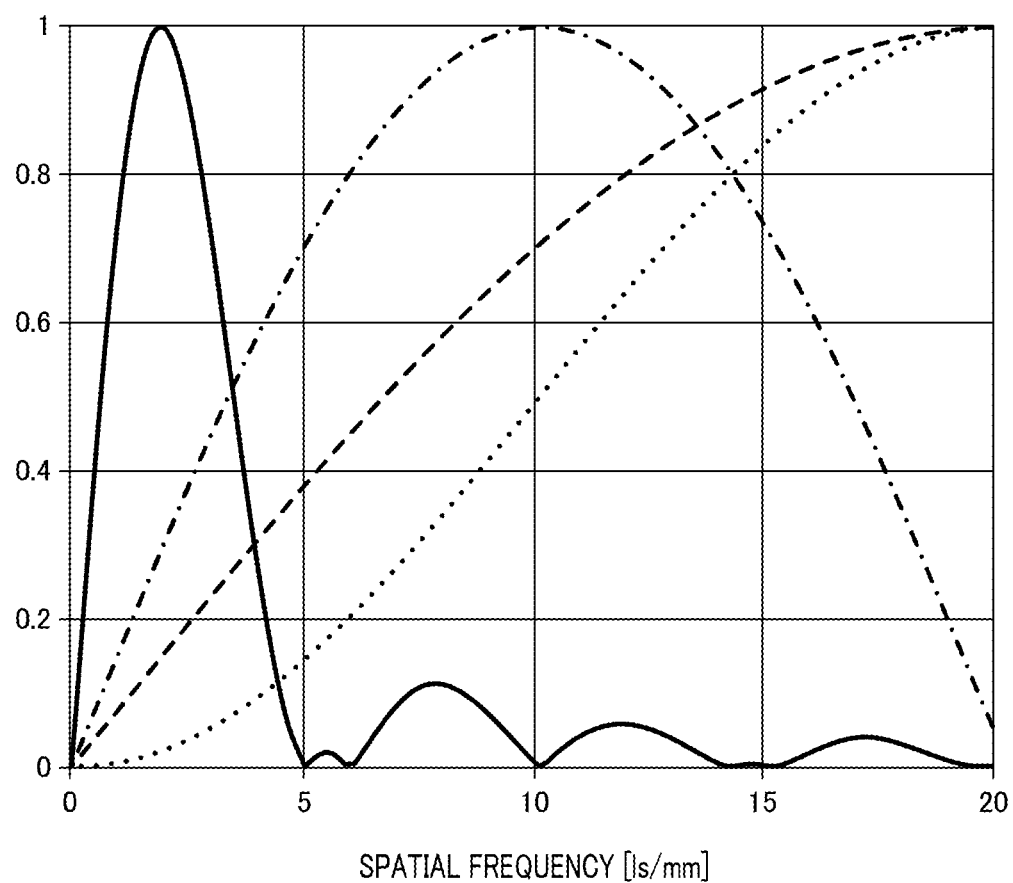
FIG. 9 illustrates frequency bands of filters according to Embodiment 1.

FIG. 9 illustrates frequency bands of filters according to Embodiment 1. A frequency band for the first filtering process is shown by a solid line in FIG. 9.

In Embodiment 1, in order to effectuate the focus detection by the phase difference method even in a large defocus condition, the frequency band for the first filtering process is configured to pass a low frequency band.

For detecting focus from the large defocus condition to a small defocus condition, the frequency band for the first filtering process may be adjusted depending on the focus condition, when needed, for example, to a higher frequency band shown as a dash-dot line in FIG. 9.

Next, in step S150 in FIG. 7, a correlation value (the first evaluation value) is calculated by a first shift process, in which the phase of the first focus detection signal and the second focus detection signal are relatively shifted in a direction of pupil division.

The correlation value COR can be calculated by the following equation, wherein A(k) and B(k) respectively denote the first focus detection signal and the second focus detection signal of k th pixel after the first filtering process, W denotes a range of k within the focus detection area, s1 denotes an amount of shift by the first shift process, and Γ1 denotes a range of s1.

$$COR(s_1) = \sum_{k \in W} |A(k) - B(k - s_1)|, s_1 \in \Gamma 1$$

When the amount of shift by the first shift process is s1, a shift subtraction signal is generated by subtracting B(k−s1), which is the second focus detection signal of (k−s1) th pixel, from A(k), which is the first focus detection signal of k th pixel. Generating an absolute value of the shift subtraction signal, summing the absolute values for all k within W, which corresponds to the focus detection area, the correlation value COR (s1) of each row is calculated.

The correlation value COR (s1) of some rows may be added together, by each shift amount s1, if necessary.

In step S160, based on the correlation value, the image shift amount p1 is obtained by calculating a shift amount (as a real number) when the correlation value is minimum, using a subpixel operation.

Then, the image shift amount p1 is multiplied by the shading correction coefficient K1 that depends on a distance from the center of the image sensor, an F number of the focusing optical system, and the exit pupil distance Dl so that a defocus amount Def is detected.

Here, the CPU 121 serves as a defocus amount detection means for detecting the defocus amount of the object using the phase difference detection method.

Figure 10:
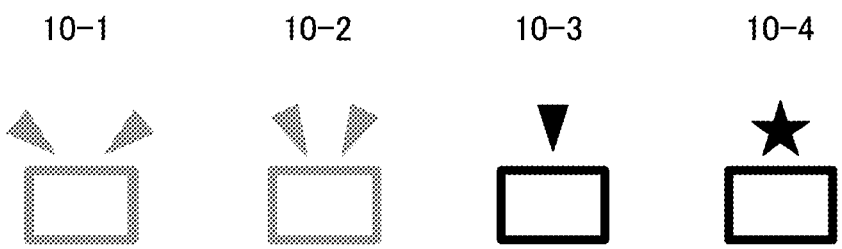
FIG. 10 illustrates an example of an in-focus display according to Embodiment 1.

Next, an example of indications for displaying focus conditions when using the MF operation is explained using FIG. 10, which illustrates an example of an in-focus indication according to Embodiment 1.

In step S161, it is determined whether the defocus amount Def is smaller than a predetermined threshold value T1, which is a first in-focus determination.

Here, T1=F×δ×(minimum F number)/(current F number), wherein δ denotes a diameter of permissible circle of confusion.

Therefore, T1 is defined by a product of δ (a diameter of permissible circle of confusion) and F number, and is defined by a product of the minimum F number and an inverse number of the current F number.

Here, the CPU 121 serves as a determination means for determining the in-focus condition based on that the defocus amount of the object is smaller than a predetermined value T1, which is based on the minimum F number within a predetermined range of the optical system.

If Yes in step S161, then in step S162, an indication 10-4 shown in FIG. 10 is displayed. Here, the display device 131 serves as a focus indication means for indicating the indication 10-4 (a first in-focus indication) in the in-focus condition.

If No in step S161, then this flow goes to step S163 and it is determined whether the defocus amount Def is smaller than a predetermined threshold value T2 (a second threshold value), which is a second in-focus determination.

That is, in the second in-focus determination, it is determined whether the defocus amount Def is larger than T1, which is the first threshold value, and is smaller than T2, which is the second threshold value.

If Yes in step S163, then in step S164, an indication 10-3 (a second in-focus indication) is displayed.

If No in step S163 then the flow goes to step S165. Here, T2=F×δ, for example.

In step S165, it is determined whether the defocus amount Def is smaller than a predetermined threshold value T3, and if Yes, then in step S166, an indication 10-2, as another indication, is displayed. Here, for example, T3=3F×δ, and T4> T3> T2> T1.

If No in step S165, then in step S167, an indication 10-1, as further another indication, is displayed.

In Embodiment 1, indications are displayed on a display device 131 of the image pickup apparatus according to the defocus amount calculated by the image plane phase difference method, when a user manually adjusts focus positions.

The indication 10-1 is displayed when the defocus amount Def1 is more than T3. The indication 10-2 is displayed when the defocus amount Def1 is equal to or more than T2 and smaller than T3. The indication 10-3 is displayed when the defocus amount Def1 is equal to or more than T1 and smaller than T2. The indication 10-4 is displayed when the defocus amount Def1 is smaller than T1, which means that the indication 10-4 is closer to real in-focus condition than the indication 10-3.

Thus, in Embodiment 1, two types of the in-focus indications 10-3 and 10-4 are selectively displayed.

This is because that in Embodiment 1, the indications for indicating the focus condition are based on a function of F number.

When using photo taking lenses having various optical functions, a field of depth is determined by F number of the lens, therefore if in-focus condition is determined based on the defocus amount in mm, depending on F number at that time, blurring differs.

Therefore, for users of the image pickup apparatus, it is assumed to be better to determine the in-focus condition based on a blurring condition instead of based on the defocus amount in mm.

For example, F number is 2.8 and the diameter of permissible circle of confusion is $\delta$ μm, the threshold. T2 is defined, for example, by 1 F×$\delta$, that is 2.8×$\delta$ μm.

If the photo taking lens is a zoom lens, an open F number in wide and an open F number in tele are generally different.

So, assume that the open F number in wide is 2.8 and the open F number in tele is 5.6, and a user manually adjust focusing around tele.

In this situation, if indications 10-1 up to 10-3 are used as the focus condition indication of the image pickup apparatus, even if the in-focus indication is displayed when the defocus amount is smaller than 1 F×$\delta$ in tele, it merely shows that the defocus amount is smaller than 1 F×$\delta$.

Therefore, it is uncertain whether the defocus amount is close to 0 F×$\delta$. In addition, if the user zooms out to wide end, since the in-focus indication is based on the function of F number, F number becomes 2.8 and the defocus amount 1 F×$\delta$ varies.

In this case, although the used does not change the focus condition, in-focus indication will change, for example, to indication 10-1 or 10-2, which are out-of-focus indications.

Considering the above problem, Embodiment 1 has two types of in-focus indications 10-3 and 10-4 so that the in-focus indication can be maintained, even if a user operates a zoom function.

As explained in the above, T1 (first focus threshold) and the first focus indication is determined based on the minimum F number throughout all zoom range of the photo taking lens.

In the above example, F2.8 in wide is used throughout wide to tele, and the second focus threshold is determined based on 1 F×$\delta$ calculated by the F2.8.

T1 (the first focus threshold) is set as T1=F×$\delta$×(minimum F number)/(current F number).

In Embodiment 1, the indication 10-4 is displayed as the first in-focus indication.

The second focus threshold is obtained based on 1 F×$\delta$, which uses the current F number and a zoom condition, and the second in-focus indication is displayed based on the second focus threshold.

In the above example, F2.8 in wide, F5.6 in tele are used. In middle of the zoom range, the open F number may be used. In Embodiment 1, the indication 10-3 is used as the second in-focus indication.

As two types of the in-focus indications are provided in the image pickup apparatus, when a user manually adjust focusing or the zooming, focusing is adjusted by the MF operation in tele until the indication 10-3 is displayed, so that the blur amount should be less than 1 F×$\delta$ and an image having sufficient resolution is obtained without recognizable blur.

Contrary to the above, if photo taking operation is performed by zooming from tele to wide, a user adjusts focus by MF until the indication 10-4 (the first in-focus indication) is obtained, so that even if zoom operation is continued after that, the in-focus indication does not change to out-of-focus indication. Further, even after zooming to wide, the in-focus indication can indicate that sufficient accuracy of focusing is kept without recognizable blur.

Embodiment 2

Next, the Embodiment 2 is explained.

In Embodiment 1, two types of indications for indicating in-focus condition, that is, the second in-focus indication for displaying an in-focus condition depending on the current F number, and the first in-focus indication for displaying an in-focus condition without depending on the F number.

However, in Embodiment 2, one type of in-focus indication is used, while it is made possible to taking pictures without becoming out-of-focus after a zooming operation.

In Embodiment 2, the defocus amount is indicated by indications 11-1 to 11-3 as shown in FIG. 11.

Those indications are similar to conventional indications, but in-focus threshold values for those indications are determined in a similar way as Embodiment 1.

That is, indications 11-1 and 11-2 respectively correspond to the indications 10-1 and 10-2, and the indication 11-3 corresponds to the indication 10-4.

In addition, a flowchart for displaying the indications shown in FIG. 11 is almost the same as the flowchart shown in FIG. 7, except that the steps S163 and S164 are eliminated from FIG. 7.

Furthermore, in step S162, step S166, and step S167, the indications 11-3, 11-2, and 11-1 are respectively displayed, so that an in-focus threshold value used for the indication 11-3 is set to T1, wherein, for example, T1=F×$\delta$×(minimum F number)(current F number).

Specifically, focus threshold values for in-focus indications in respective zoom conditions are calculated based on the minimum F number throughout the zoom range as explained in Embodiment 1.

As explained in Embodiment 1, if F2.8 in wide is the minimum F number, for example, the in-focus indication in tele is displayed using the focus threshold value calculated based on F2.8, that is, since F5.6 is in tele, if the defocus amount becomes smaller than 0.5 F×$\delta$, the indication 11-3 is displayed.

According to the above Embodiment 2, after the manual focusing, even if the photo taking lens is operated to whatever condition, the in-focus indication is kept displayed.

Embodiment 3

According to Embodiment 1 and Embodiment 2, once a user adjust focus by the MF operation, even if whatever zoom operation is performed, the in-focus indication is kept while taking pictures.

In addition, once a user adjust focus by the MF operation, even if the defocus amount passes over the first threshold value when F number is changed by a zoom operation, the in-focus indication may be kept displayed.

In that case, if the user notice that the image on the display is blurred although the in-focus indication is kept displayed, and the user try to adjust focus by the MF operation, at that time, the determination of in-focus may be repeated using the threshold value based on the F number at that time.

Thereby, while keeping displaying the in-focus indication, only in a case a blur appears, the in-focus indication can be renewed using proper threshold value at that time.

Embodiment 4

As another embodiment, once a user adjust focus to achieve the in-focus condition by the MF operation, for example, if the defocus amount passes over the first threshold value when F number is changed, at that time, an autofocus may be operated so as to make the defocus amount become smaller than the second focus threshold value.

As another embodiment, the first focus indication 10-4 and the second focus indication 10-3 may be displayed in the same color, such as green, and the color may be different from colors of the other indications 10-1 and 10-2, which are for example gray.

By using the same color for the first focus indication 10-4 and the second focus indication 10-3, the user does not mind even if the in-focus condition is changed between the first in-focus indication and the second in-focus indication when the zooming operation is performed, because the user can recognize that the in-focus condition is maintained.

According to the above embodiments, the user can take pictures, while the in-focus indication is maintained even if the zoom operation is performed.

Although in the above embodiments, the image plane phase difference method is used, the present invention can be applied to other type of focus detection method.

For example, a focus detection means using an external distance measuring device or any other focus detection means may be used as far as the defocus amount can be detected.

Furthermore, forms of the indications are not limited to those shown in FIGS. 10 an 11, any forms may be used for indicating the defocus amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention can be realized in processes in which a program that executes one or more functions of the above embodiment is supplied to a system or a device through a network or a storage medium, and one or more processors in a computer of the system or the device read and execute the program. In addition, the present invention can be realized by a circuit (for example, an ASIC) that implements one or more functions.

This application claims the benefit of Japanese Patent Application No. 2019-31396 filed on Feb. 25, 2019, which is hereby incorporated by reference herein in its entirety.

What is claimed is:

1. An image pickup apparatus comprising:
    an image pickup unit configured to pick up an optical image formed through an optical system, wherein the optical system has a zoom function and F number thereof varies within a predetermined range according to a plurality of zoom conditions;
    one or more processors; and
    a memory storing instructions which, when the instructions are executed by the one or more processors, cause the image pickup apparatus to function as:
    a determination unit configured to determine a first in-focus condition in a case where a defocus amount of an object is smaller than a predetermined first threshold value, and to determine a second in-focus condition in a case where the defocus amount of the object is equal to or larger than the first threshold value and smaller than a second threshold value that is larger than the first threshold value, wherein the first threshold value is determined by a minimum F number within the predetermined range; and
    a focus indication unit configured to indicate a first in-focus indication in a case where the determination unit determines that the focus condition is the first in-focus condition, and to indicate a second in-focus indication in a case where the determination unit determines that the focus condition is the second in-focus condition.

2. The image pickup apparatus according to claim 1, wherein the optical system is included in a lens barrel that has an operation member for performing a focusing operation for focusing on an object by manually operating the optical system.

3. The image pickup apparatus according to claim 1, wherein the optical system includes a zoom lens unit that can be detachably mounted to the image pickup apparatus, wherein the image pickup apparatus includes a communication unit for obtaining information on the minimum F number from the zoom lens unit.

4. The image pickup apparatus according to claim 1, wherein the image pickup unit includes a defocus amount detection unit for detecting the defocus amount of the object by using a phase difference detection method.

5. The image pickup apparatus according to claim 1, further comprising an autofocus unit configured to automatically perform a focusing operation.

6. The image pickup apparatus according to claim 5, wherein the autofocus unit automatically performs the focusing operation if the focusing condition becomes an out-of-focus condition according to the change of the F number of the optical system after the determination unit determines the in-focus condition.

7. The image pickup apparatus according to claim 1, further comprising another focus indication when the first in-focus indication or the second in-focus indication is not indicated.

8. The image pickup apparatus according to claim 7, wherein a color of the first in-focus indication is the same as a color of the second in-focus indication, and is different from a color of said another focus indication.

9. The image pickup apparatus according to claim 1, wherein the first threshold value is determined based on a product of a diameter of permissible circle of confusion δ and the F number.

10. The image pickup apparatus according to claim 9, wherein the first threshold value is determined based on a product of an inverse number of a current F number and the minimum F number.

11. A non-transitory computer-readable recording medium storing a computer program for controlling an image pickup apparatus having an image pickup unit configured to pick up an optical image formed through an optical system, wherein the optical system has a zoom function and F number thereof varies within a predetermined range according to a plurality of zoom conditions, the computer program comprising:

a determination step for determining a first in-focus condition in a case where a defocus amount of an object is smaller than a predetermined first threshold value, and for determining a second in-focus condition in a case where the defocus amount of the object is equal to or larger than the first threshold value and smaller than a second threshold value that is larger than the first threshold value, wherein the first threshold value is determined by a minimum F number within the predetermined range; and a focus indication step for indicating a first in-focus indication in a case where the determination step determines that the focus condition is the first in-focus condition, and for indicating a second in-focus indication in a case where the determination step determines that the focus condition is the second in-focus condition.

* * * * *